Figure 1:
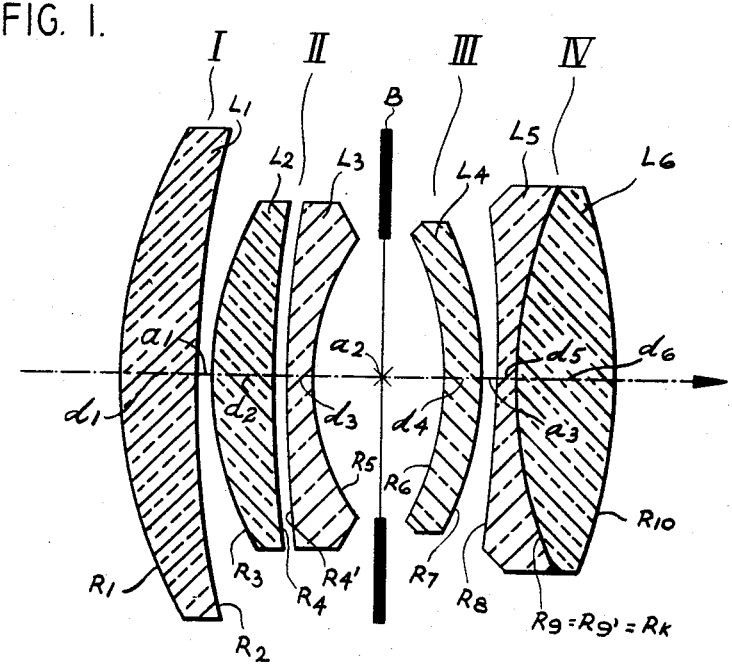

Aug. 18, 1953

A. W. TRONNIER 2,649,023

MODIFIED GAUSS-TYPE FOUR-COMPONENT
PHOTOGRAPHIC OBJECTIVE
Filed Nov. 17, 1950

INVENTOR.
ALBRECHT WILHELM TRONNIER
BY Moek-Blum
ATTORNEYS.

Patented Aug. 18, 1953

2,649,023

UNITED STATES PATENT OFFICE 2,649,023

MODIFIED GAUSS-TYPE FOUR-COMPONENT PHOTOGRAPHIC OBJECTIVE

Albrecht Wilhelm Tronnier, Gottingen, Germany, assignor to Voigtländer & Sohn Aktiengesellschaft, Braunschweig, Germany, a corporation of Germany Application November 17, 1950, Serial No. 196,101
In Switzerland January 27, 1950

4 Claims. (Cl. 88—57)

This invention relates to photographic objectives of high light-transmitting capacity showing anastigmatic image field flattening. These objectives belong to that modified Gauss-type having a large field of view, in which the diaphragm is enclosed by two systems of lenses in such a manner, that in the front system located on the side of the major conjugate, as well as in the rear system following the diaphragm in the direction of the light on the side of the minor conjugate, an uncemented meniscus-shaped individual lens is followed by a composite lens group of opposite power. Modified Gauss objectives of this type permit of obtaining an anastigmatically flattened image field of an effective size of 50° with a satisfactory correction of the apertural errors.

It is one object of the present invention to provide a photographic objective of the above mentioned type, in which the anastigmatically flattened image field is substantially increased.

Another object of the invention is to provide improved objectives of the before-mentioned type showing specific wide angle properties which permit, even in the case of objectives of high light-transmitting capacity, to draw with a predetermined focal length of the objective, a field of vision, the image diagonal of which is distinctly greater than said focal length.

Numerous other objects, advantages, and features of this invention are set forth in the following description and the annexed drawings, which include a preferred example, to which the invention is not limited.

In the drawings,

Figure 1 is a vertical, axial section of the improved objective, taken along its optical axis. The horizontal optical axis is indicated by the horizontal arrow, which also indicates the direction of the light, from left to right. The object space is at the left of the objective, and the image space is at the right of the objective.

Figure 2:
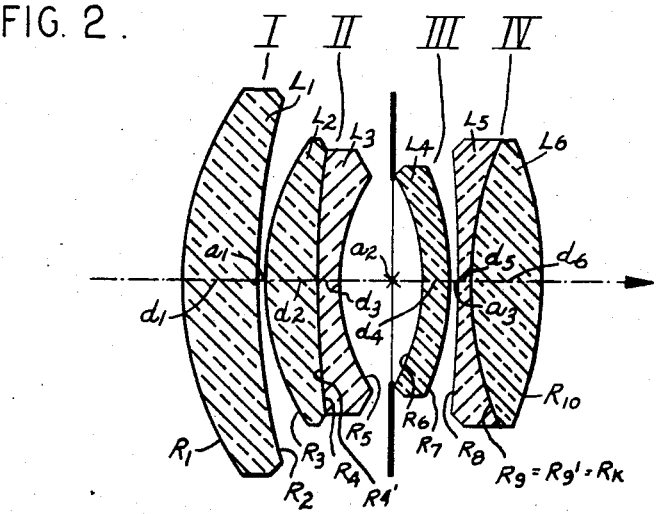

Figure 2 is a view substantially similar to that shown in Figure 1.

In Figure 1, lens elements I, II and III, IV arranged on opposite sides of the diaphragm B, as well as the lenses (L), radii (R), thicknesses (d) and air spaces (a) are consecutively numbered in the direction from the major to the minor conjugate. Thus, the lenses are denoted $L_1$, $L_2$, $L_3$, $L_4$, $L_5$, $L_6$, the radii of the lens surfaces $R_1$, $R_2$, $R_3$, $R_4$, $R_4'$, $R_5$, $R_6$, $R_7$, $R_8$, $R_9$, $R_9'$, $R_{10}$. $d_1$, $d_2$, $d_3$, $d_4$, $d_5$, $d_6$ denote the thickness of lenses $L_1$ to $L_6$, respectively, $a_1$ denotes the distance or air space between lenses $L_1$ and $L_2$, $a_2$ the distance between lenses $L_3$ and $L_4$, and $a_3$ the distance between lenses $L_4$ and $L_5$. The thickness of the lenses ($d_1$ to $d_6$) and said distances between the lenses are measured on the horizontal optical axis.

In order to attain the above mentioned objects, the new objective of the present invention is built in such a manner that, on the one hand, in the front and rear system, the two meniscus-shaped individual lenses (I and III) turned toward the major conjugate, are of opposite power and consist of glasses of such heavy refractive capacity that the arithmetical mean of their refraction indices for yellow light is distinctly greater than 1.65, and, on the other hand, simultaneously in the rear system the "last" lens group (IV), in the sense of the photographic picture, located on the side of the minor conjugate, contains a distinctly collecting cemented surface arranged in such a manner that said surface has a convex curvature relative to the preceding diaphragm and to the major conjugate, and the glasses joined at said surface show a difference of the refraction indices for yellow light, which is distinctly greater than 0.030.

In order to reduce lateral zonal errors, this collecting surface having the radius of curvature denoted in Fig. 1 by reference symbol $R_k$, is curved to such an extent that its radius of curvature is, on the one hand, distinctly smaller than 2/3 of the equivalent focal length of the total objective, and, on the other hand, shows such a ratio of length to each of the absolute values of the radii ($R_1$ and $R_{10}$) of the outer surfaces limiting the total system, that the numerical value of these ratios of radii ($R_k:R_1$ and $R_k:R_{10}$) is within the range of 2/3 and 3/2.

According to investigations made in connection with the present invention, it is also of advantage if the two meniscus-shaped lens elements (II and III), which enclose the diaphragm space, preferably show, in accordance with the present invention, such a specific ratio of curvatures relative to the outer lens elements I and IV, that the convex front radius ($R_3$) of the inner lens group II, which is adjacent the diaphragm, as well as the outer radius ($R_7$) of the meniscus-shaped negative lens III which follows the diaphragm, is turned away from the same and is concave relative to the latter, is simultaneously, on the one hand, distinctly greater than 0.5× the length of the longer radius of curvature, and, on the other hand, is likewise distinctly greater than 0.6×the length of the shorter radius of curvature of the two outer surfaces having the radii $R_1$ and $R_{10}$, which limit the total objective and are likewise concave relative to the diaphragm.

These two outer surfaces of the total objective are preferably curved to such an extent that at least the shorter of their radii of curvature ($R_1$, $R_{10}$) is equal to or smaller than the sum of the radii of curvature of the two outer limiting surfaces ($R_3+R_5$ and $R_6+R_7$) of each of the two interiorly arranged lens groups II and III which enclose the diaphragm, said sums being calculated in absolute value.

Figure 2 illustrates in natural size an embodiment of the invention in which the equivalent focal length is f=150 mm. and the structure of which is proportional to the following numerical example. The data of the latter are based on a focal length of 1. Correspondingly, the radii of lenses as well as the thicknesses of the lenses and their air spaces measured along the optical axis are stated in the same unit. At the high relative aperture of 1:2.9 the effective field of vision has an extent of about 63° which further increases already at medium diaphragmation to almost 70° and in this case an image results, the diagonal of which is equal to 1.4 times the focal length of the objective.

In the following numerical example, the glasses of lenses $L_1$ to $L_6$ are denoted by their correspondingly numbered mean refraction indices $n_D$ for the yellow spectral line of helium light ($n_1$ to $n_6$) and in connection with their color dispersion by the respective numerical value of their Abbé number ($\nu_1$ to $\nu_6$).

The individual lens members I, II, III and IV forming the objective according to the invention meet the following requirements: the focal length $f_1$ of front member I consisting of a meniscus-shaped individual lens is in the range of 0.80 times and 1.80 times the equivalent focal length F of the total objective; lens member II consisting of two individual lenses of opposite power, has a focal length $f_{2_3}$ in the range −1.65 times and −3.30 times the equivalent focal length F of the total objective; meniscus-shaped individual lens member III has a focal length $f_4$ in the range of −1.65 times and −3.30 times the equivalent focal length F of the total objective and the focal length $f_{5_6}$ of composite lens member IV, consisting of two cemented individual lenses, is in the range of 0.60 times and 1.20 times the equivalent focal length F of the total objective.

Furthermore, the radii of curvature of the individual refractive surfaces of the objective meet the following requirements:

$$0.40\ F < R_1 < 0.60\ F$$
$$0.60\ F < R_2 < 1.20\ F$$
$$0.27\ F < R_3 < 0.47\ F$$
$$\tfrac{1}{2}F < \pm R_4 = R_4' < \infty$$
$$0.20\ F < R_5 < 0.30\ F$$
$$0.23\ F < -R_6 < 0.33\ F$$
$$0.27\ F < -R_7 < 0.47\ F$$
$$\tfrac{1}{2}\ F < \pm R_8 < \infty$$
$$0.40\ F < R_9 = R_9' < 0.60\ F$$
$$0.46\ F < -R_{10} < 0.68\ F$$

The focal length of the lens members of the objective shown in the following Numerical Example, are as follows:

$$f_1 = +1.319$$
$$f_{2_3} = -2.325$$
$$f_4 = -2.535$$
$$f_{5_6} = +0.895$$

*Numerical example* f=1.0

| | | | |
|---|---|---|---|
| $R_1=$ +0.48127 | $d_1=0.09575$ | $n_1=1.65908$ | $\nu_1=50.7$ |
| $R_2=$ +0.99312 | $a_1=0.00442$ | air | |
| $R_3=$ +0.34952 | | | |
| $R_4=R_4'=+1.50633$ | $d_2=0.07218$ | $n_2=1.62088$ | $\nu_2=60.3$ |
| $R_5=$ +0.25006 | $d_3=0.02946$ | $n_3=1.62092$ | $\nu_3=36.3$ |
| | $a_2=0.10311$ | air, diaphragm space | |
| $R_6=$ −0.27870 | | | |
| $R_7=$ −0.34952 | $d_4=0.04272$ | $n_4=1.72717$ | $\nu_4=28.4$ |
| $R_8=$ −3.60953 | $a_3=0.00295$ | air | |
| $R_9=R_9'=+0.48127$ | $d_5=0.02504$ | $n_5=1.60700$ | $\nu_5=49.2$ |
| $R_{10}=$ −0.56376 | $d_6=0.08986$ | $n_6=1.65953$ | $\nu_6=57.0$ |

From the above it follows:

$n_1=1.65908$ $n_4=1.72717$ $n_1+n_4=3.38625$ $\tfrac{1}{2}(n_1+n_4)=1.693125$, i. e. distinctly greater than 1.65.

$n_6-n_5=1.65953-1.60700=0.05253$, i. e. distinctly greater than 0.030.

$R_k=R_9=0.48127$, i. e. distinctly smaller than 2/3.

$R_k:R_1=0.48127:0.48127=1.000$ and $R_k:R_{10}=0.48127:0.56376=0.85368$. Both values are in the range between 0.6667 and 1.5000, i. e. between 2/3 and 3/2.

$0.5 \times R_{10}=0.28188$ $0.6 \times R_1=0.28876$

Furthermore, $R_3=0.34952$ and $R_7=0.34952$, i. e. these values are distinctly greater than 0.28188 and 0.28876.

Furthermore, $R_3=0.34952$ $\qquad$ $R_6=0.27870$
$R_5=0.25006$ and $R_7=0.34952$
$R_3+R_5=0.59958$ abs. $\qquad$ $R_6+R_7=0.62822$ abs.

Both sums are greater than $R_1=0.48127$ and $R_{10}=0.56376$, in absolute values.

The term "outer lens surfaces limiting the total objective" is used in the present specification and claims to denote, from the left to the right in the drawings, the first lens surface and the last lens surface, i. e. $R_1$ and $R_{10}$ in Figure 1 of the drawings.

A preferred embodiment of this invention has been described, but numerous changes, omissions, additions and substitutions can be made without departing from its scope.

As will be seen from the drawings, in the embodiment shown in Figure 1 there is an air-space between lenses $L_2$ and $L_3$ while in the embodiment shown in Figure 2 the lens elements corresponding to $L_2$ and $L_3$ are cemented together. Both of these embodiments can be used in carrying out the present invention. Depending on the optical requirements of the individual cases, radii $R_4$ and $R_4'$ may be equal or different. In the first case, lenses $L_2$ and $L_3$ will be cemented together, while in the second case, illustrated in Figure 1, they are separated by an air-space. Such variations can be made substantially without affecting the results obtained by the present invention.

What I claim is:

1. Photographic objective of the modified Gauss-type, of high light-transmitting capacity and anastigmatic flatness of the image field, comprising in combination a first lens system and a second lens system in combination with an intermediate diaphragm enclosed by said first and second system, and consisting of the following members consecutively arranged in the direction toward the photographic image: a front member consisting of a meniscus-shaped individual lens, the proper focal length of which is in the range of 0.80 times and 1.80 times the equivalent focal length of the total objective; a composite member consisting of two individual lenses of opposite power, the proper focal length of said composite member being in the range of −1.65 times and −3.30 times the equivalent focal length of the total objective; an individual meniscus-shaped lens member separated from the preceding lens member by the diaphragm space, the proper focal length of this meniscus-shaped lens member being in the range of −1.65 times and −3.30 times the equivalent focal length of the total objective; and a composite lens member terminating the objective on the image side and consisting of two cemented individual lenses of opposite power, the proper focal length of this composite cemented lens member being in the range of 0.60 times and 1.20 times the equivalent focal length of the total objective.

2. Photographic objective as claimed in claim 1, in which the radii of curvature of the individual refractive surfaces meet the following conditions:

$$0.40\ F < R_1 < 0.60\ F$$
$$0.60\ F < R_2 < 1.20\ F$$
$$0.27\ F < R_3 < 0.47\ F$$
$$\tfrac{1}{2}\ F < \pm R_4 = R_4' < \infty$$
$$0.20\ F < R_5 < 0.30\ F$$
$$0.23\ F < -R_6 < 0.33\ F$$
$$0.27\ F < -R_7 < 0.47\ F$$
$$\tfrac{1}{2}\ F < \pm R_8 < \infty$$
$$0.40\ F < R_9 = R_9' < 0.60\ F$$
$$0.46\ F < -R_{10} < 0.68\ F$$

wherein $R_1$, $R_2$, $R_3$, $R_4$, $R_4'$, $R_5$, $R_6$, $R_7$, $R_8$, $R_9$, $R_9'$ and $R_{10}$ stand for the radii of curvature of the successive lens surfaces in the direction of light toward the photographic image and $F$ stands for the equivalent focal length of the total objective.

3. Photographic objective of the modified Gauss-type of high light-transmitting capacity and extended anastigmatically flattened image field, in which the diaphragm is enclosed by two lens systems in such a manner that in the front system located on the side of the major conjugate as well as in the rear system following the diaphragm on the side of the minor conjugate, one simple uncemented meniscus-shaped individual lens is followed by a composite lens group of opposite power in the sense of the direction of light; the two meniscus-shaped individual lenses of the front system and rear system, which are turned toward the side of the major conjugate, are of opposite power and consist of glasses of heavy refractive power, the arithmetical mean of the refraction indices of which, for yellow light, is distinctly greater than 1.65; the last lens group in the meaning of the photographic picture, located on the side of the minor conjugate having a distinctly collecting cemented surface which has a convex curvature relative to the preceding diaphragm and relative to the side of the major conjugate, said cemented surface being limited by glasses, the difference of refraction indices of which, for yellow light, is distinctly greater than 0.030; the proper focal length of the simple uncemented meniscus-shaped individual lens arranged on the side of the major conjugate being in the range of 0.80 times and 1.80 times the equivalent focal length of the total objective; the composite lens group containing two individual lenses of opposite power and arranged on the side of the major conjugate having a proper focal length in the range of −1.65 times and −3.30 times the equivalent focal length of the total objective; the meniscus-shaped individual lens following the diaphragm in the direction of light having a proper focal length in the range of −1.65 times and −3.30 times the equivalent focal length of the total objective; the last lens group in the meaning of the photographic picture having a proper focal length in the range of 0.60 times and 1.20 times the equivalent focal length of the total objective.

4. Photographic objective of the modified Gauss-type of high light-transmitting capacity and extended anastigmatically flattened image field, in which the diaphragm is enclosed by two lens systems in such a manner that in the front system located on the side of the major conjugate as well as in the rear system following the diaphragm on the side of the minor conjugate, one simple uncemented meniscus-shaped individual lens is followed by a composite lens group of opposite power in the sense of the direction of light; the two meniscus-shaped individual lenses of the front system and rear system, which are turned toward the side of the major conjugate, are of opposite power and consist of glasses of heavy refractive power, the arithmetical mean of the refraction indices of which, for yellow light, is distinctly greater than 1.65; the last lens group in the meaning of the photographic picture, located on the side of the minor conjugate having a distinctly collecting cemented surface which has a convex curvature relative to the preceding diaphragm and relative to the side of the major conjugate, said cemented surface being limited by glasses, the difference of refraction indices of which, for yellow light, is distinctly greater than 0.030; the proper focal length of the simple uncemented meniscus-shaped individual lens arranged on the side of the major conjugate being in the range of 0.80 times and 1.80 times the equivalent focal length of the total objective; the composite lens group containing two individual lenses of opposite power and arranged on the side of the major conjugate having a proper focal length in the range of −1.65 times and −3.30 times the equivalent focal length of the total objective; the meniscus-shaped individual lens following the diaphragm in the direction of light having a proper focal length in the range of −1.65 times and −3.30 times the equivalent focal length of the total objective; the last lens group in the meaning of the photographic picture having a proper focal length in the range of 0.60 times and 1.20 times the equivlent focal length of the total objective; the radii of curvature of the individual refractive surfaces in the objective meeting the following conditions:

$$0.40\ F < R_1 < 0.60\ F$$
$$0.60\ F < R_2 < 1.20\ F$$
$$0.27\ F < R_3 < 0.47\ F$$
$$\tfrac{1}{2}\ F < \pm R_4 = R_4' < \infty$$
$$0.20\ F < R_5 < 0.30\ F$$
$$0.23\ F < -R_6 < 0.33\ F$$
$$0.27\ F < -R_7 < 0.47\ F$$
$$\tfrac{1}{2}\ F < \pm R_8 < \infty$$
$$0.40\ F < R_9 = R_9' < 0.60\ F$$
$$0.46\ F < -R_{10} < 0.68\ F$$

wherein $R_1$, $R_2$, $R_3$, $R_4$, $R_4'$, $R_5$, $R_6$, $R_7$, $R_8$, $R_9$, $R_9'$ and $R_{10}$ stand for the radii of curvature of the successive lens surfaces in the direction of light toward the photographic image and $F$ stands for the equivalent focal length of the total objective.

ALBRECHT WILHELM TRONNIER.

References Cited in the file of this patent

UNITED STATES PATENTS

| Number | Name | Date |
|---|---|---|
| 1,899,934 | Berek | Mar. 7, 1933 |
| 1,945,570 | Rudolph | Feb. 6, 1934 |
| 2,164,028 | Berek | June 27, 1939 |
| 2,171,640 | Berek | Sept. 5, 1939 |
| 2,171,641 | Berek | Sept. 5, 1939 |

FOREIGN PATENTS

| Number | Country | Date |
|---|---|---|
| 428,657 | Germany | May 10, 1926 |
| 665,520 | Germany | Sept. 27, 1938 |